US008281386B2

(12) United States Patent
Milligan et al.

(10) Patent No.: US 8,281,386 B2
(45) Date of Patent: Oct. 2, 2012

(54) SYSTEMS AND METHODS FOR AUTOMATIC SECRET GENERATION AND DISTRIBUTION FOR SECURE SYSTEMS

(75) Inventors: Thomas Milligan, South Jordan, UT (US); Bryant Eastham, Draper, UT (US)

(73) Assignee: Panasonic Corporation, Osaka (JP)

( * ) Notice: Subject to any disclaimer, the term of this patent is extended or adjusted under 35 U.S.C. 154(b) by 1369 days.

(21) Appl. No.: 11/314,808

(22) Filed: Dec. 21, 2005

(65) Prior Publication Data

US 2007/0143838 A1 Jun. 21, 2007

(51) Int. Cl.
*G06F 15/16* (2006.01)
*G06F 17/20* (2006.01)

(52) U.S. Cl. ........... 726/15; 726/5; 726/6; 726/7; 726/9; 726/10; 380/262; 380/268; 380/278; 380/284; 380/44; 705/66; 705/76; 705/80; 709/222; 709/227; 709/230; 713/153; 713/155; 713/159; 713/168; 713/172; 713/185

(58) Field of Classification Search ...................... 726/15
See application file for complete search history.

(56) References Cited

U.S. PATENT DOCUMENTS

| | | | |
|---|---|---|---|
| 4,351,982 A | 9/1982 | Miller et al. | |
| 4,633,036 A | 12/1986 | Hellman et al. | |
| 5,142,579 A | 8/1992 | Anderson | |
| 6,175,921 B1 * | 1/2001 | Rosen ........................... | 713/173 |
| 6,212,635 B1 * | 4/2001 | Reardon ....................... | 713/165 |
| 6,560,581 B1 * | 5/2003 | Fox et al. ....................... | 705/51 |
| 6,597,199 B1 * | 7/2003 | Bui ................................. | 326/83 |
| 7,003,501 B2 * | 2/2006 | Ostroff .......................... | 705/76 |
| 7,179,170 B2 * | 2/2007 | Martinek et al. ............... | 463/29 |
| 7,275,102 B2 * | 9/2007 | Yeager et al. .................. | 709/224 |
| 7,380,125 B2 * | 5/2008 | Di Luoffo et al. ............ | 713/172 |
| 7,389,273 B2 * | 6/2008 | Irwin et al. .................... | 705/59 |
| 7,391,865 B2 * | 6/2008 | Orsini et al. .................. | 380/201 |
| 7,415,721 B2 * | 8/2008 | Fransdonk ........................ | 726/4 |
| 7,822,688 B2 * | 10/2010 | Labrou et al. .................. | 705/67 |
| 8,166,296 B2 * | 4/2012 | Buer et al. ..................... | 713/168 |
| 2001/0026619 A1 | 10/2001 | Howard et al. | |
| 2002/0016913 A1 * | 2/2002 | Wheeler et al. ............... | 713/170 |
| 2003/0088772 A1 | 5/2003 | Gerhmann et al. | |
| 2004/0107366 A1 * | 6/2004 | Balfanz et al. ................ | 713/201 |

FOREIGN PATENT DOCUMENTS

WO 01/97432 12/2001

OTHER PUBLICATIONS

Di Pietro, R., et al, "A Two-Factor Mobile Authentication Scheme for Secure Financial Transactions", IEEE, Jun. 2005, Proceedings of the International Conference on Mobile Business, entire document, http://ieeexplore.ieee.org/stamp/stamp.jsp?arnumber=01493584.*
Verisign, "ACC: Automatic Cryptographic Configuration of Embedded Devices", Sep. 11, 2002, http://web.archive.org/web/20020911190950/http://research.verisign.com/Papers/ACC1.html.

* cited by examiner

*Primary Examiner* — Edan Orgad
*Assistant Examiner* — Ronald Baum
(74) *Attorney, Agent, or Firm* — Austin Rapp & Hardman

(57) ABSTRACT

An authentication program on a network authenticator establishes a secure communication channel with an embedded device. The authentication program receives security credentials from an embedded device. The authentication program receives from the embedded device via the secure communication channel either a secret for the embedded device or a request to generate the secret for the embedded device. The authentication program registers the secret for the embedded device.

16 Claims, 13 Drawing Sheets

SYSTEMS AND METHODS FOR AUTOMATIC SECRET GENERATION AND DISTRIBUTION FOR SECURE SYSTEMS

TECHNICAL FIELD

The present invention relates generally to computing devices. More specifically, the present invention relates to systems and methods for automatic secret generation and distribution for secure systems.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded devices or embedded systems. (The terms "embedded device" and "embedded system" will be used interchangeably herein.) An embedded system usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

Embedded devices may establish connections to other electronic devices for a variety of reasons. For example, an organization may want to make data about its embedded devices available to certain remote clients. However, some of the data that an organization wants to make available to remote clients may be sensitive, i.e., not intended for public disclosure. This data may relate to the operation of the embedded devices themselves. For example, the data may indicate whether an embedded device is turned on, whether it is calibrated correctly, whether a cycle of operation has completed correctly, and so forth. Alternatively, or in addition, this data may relate to something other than the operation of the embedded devices. For example, the data may include a user identifier that corresponds to a user of an embedded device, a measurement taken by an embedded device, an alert generated by an embedded device, and so forth.

Embedded devices may also allow these remote clients to control the behavior of the embedded system. For example, problems found with calibration may be remotely adjusted instead of sending a person to the location of the embedded system. Alternatively, or in addition, the embedded system may allow its behavior to be changed remotely in much the same way it can be changed locally. One example would be locking a door remotely. This kind of remote control is not limited to the functionality available locally, and in many cases may exceed the local capabilities. One example would be a sensor that has no local interface but allows remote control of its behavior.

In view of the foregoing, benefits may be realized by improved mechanisms for securing connections between an embedded device and other devices or clients. Some exemplary systems and methods directed to improving the level of security of such connections are disclosed herein.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
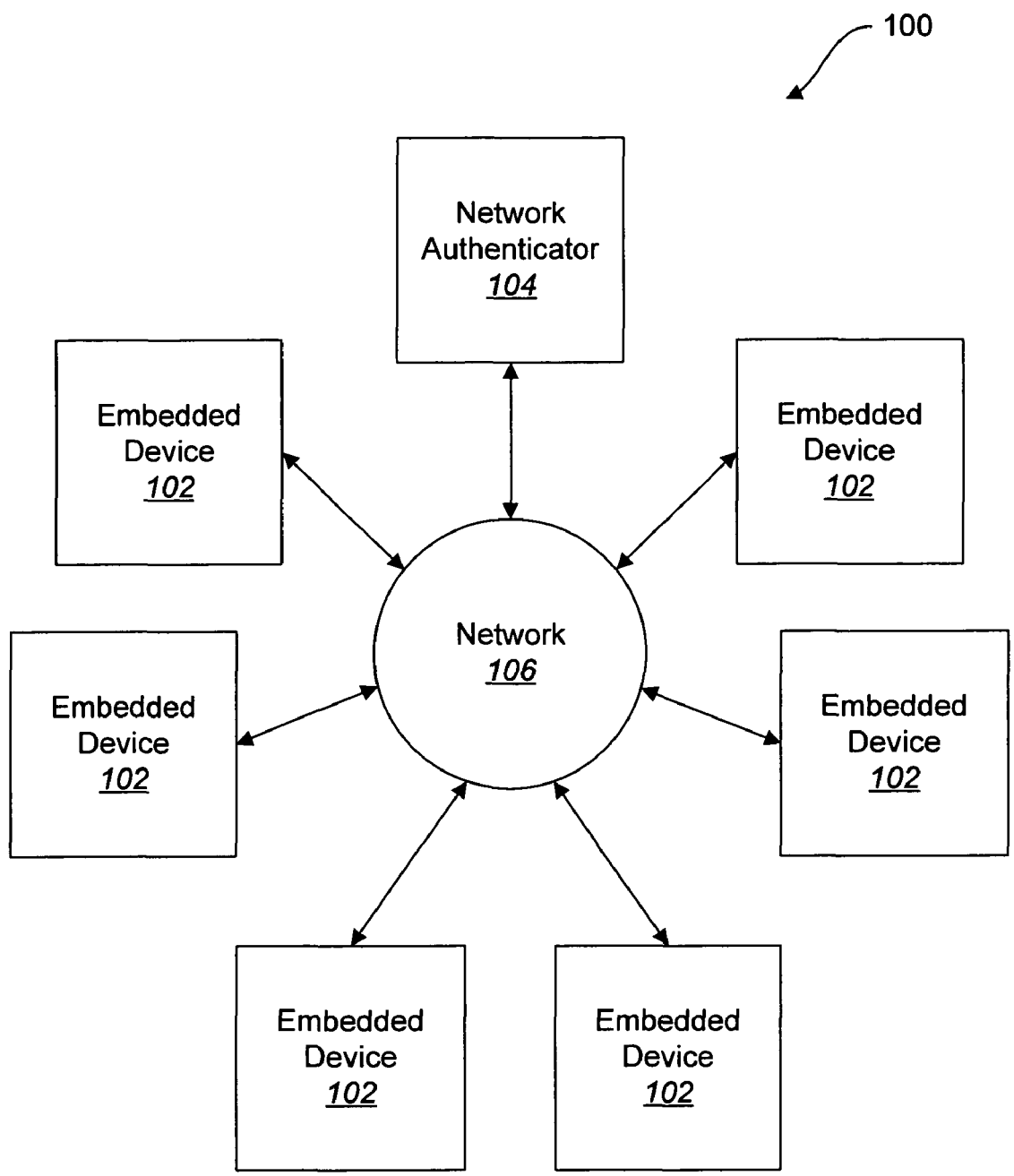
FIG. 1 is a block diagram illustrating a system for automatic secret generation and distribution for secure systems according to an embodiment.

Embodiments disclosed herein relate generally to automatic secret generation and distribution for secure systems. In accordance with an embodiment, an authentication program on a network authenticator establishes a secure communication channel with an embedded device. The authentication program receives security credentials from the embedded device. The authentication program also receives either a secret for the embedded device or a request to generate the secret for the embedded device from the embedded device via the secure communication channel. The authentication program also registers the secret for the embedded device.

In some embodiments, the authentication program generates the secret for the embedded device in response to a request. The authentication program transmits the secret to the embedded device via the secure communication channel. In an alternative embodiment, the embedded device generates the secret and the network authenticator receives the secret from the embedded device.

In a further embodiment, the authentication program receives security credentials from the embedded device and determines whether the security credentials are valid. If the authentication program determines that the security credentials are not valid, it discontinues communication with the embedded device. The authentication program also determines whether the security credentials have previously been provided to the network authenticator. If the security credentials have previously been provided to the network authenticator, the authentication program discontinues communication with the embedded device.

The authentication program receives device identification for the embedded device. The authentication program uses the device identification to register the secret by associating the secret with the device identification.

A network authenticator that is configured to implement a method for automatic secret generation and distribution for secure systems is also disclosed. A processor is in electronic communication with the memory. Instructions are stored in the memory that implement a method. The network authenticator establishes a secure communication channel with an embedded device. The network authenticator receives security credentials from the embedded device. The network authenticator receives either a secret for the embedded device or a request to generate the secret for the embedded device from the embedded device via the secure communication channel. The network authenticator then registers the secret for the embedded device.

A computer-readable medium comprising executable instructions for implementing a method for automatic secret generation and distribution for secure systems is also disclosed. The method is implemented by an authentication program on a network authenticator. The authentication program establishes a secure communication channel with an embedded device. The authentication program receives security credentials from the embedded device. The authentication program receives either a secret for the embedded device or a request to generate the secret for the embedded device from the embedded device via the secure communication channel. The authentication program then registers the secret for the embedded device.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

Secure systems of devices may require that each device within a secure system have its own secret. A large random number is typically used for a secret. The secret may be used to authenticate a device to other devices in the system. The secret may also be used to establish a secure communications channel between devices. Protection of the secret is paramount for a secure system. Once the secret of a device is known by any unauthorized party, the device may no longer be secure and typically may no longer be part of the secure network.

When a secure communications channel is established between two devices, a mechanism for authenticating one or both of the devices may be used. To authenticate the devices, the devices' secrets may be known by both devices. Alternatively, the devices may be validated by another source on the network such as a network authenticator. In either case, a device's secret may be known by the device and another authorized party on the network. For a network to be secure, the devices' secrets should be distributed securely between each device and the network entity that authenticates the device.

The process of creating a secret for a device and securely distributing the secret between the device and the entity on the network responsible for authenticating the device typically involves manual setup and configuration by a human. However, this process is arduous, prone to errors, and open to security breaches. Using a process that automatically generates secrets for devices and distributes those secrets securely without the knowledge of a human installer simplifies the installation process and protects the devices' secrets. The use of this process also makes it simpler to install a device to a secure network, reduces the probability of errors, and protects the device's secret from unauthorized access. Accordingly, in view of the foregoing, there is a need for improved mechanisms for automatic secret generation and distribution.

FIG. 1 is a block diagram illustrating a system 100 for automatic secret generation and distribution for secure systems according to an embodiment. The system 100 includes a network authenticator 104. The network authenticator 104 may be any device that includes a digital processor capable of receiving and processing data, such as microcontrollers, hand-held computers, personal computers, servers, mainframes, supercomputers, and any variation or related device thereof. A description of an embodiment of a network authenticator 104 is provided below. Although a single network authenticator 104 is shown in FIG. 1, embodiments may be practiced in systems with multiple network authenticators 104.

The system 100 also includes multiple embedded devices 102. An embedded device 102 is a type of computing device that may not include all the same components associated with a typical desktop computer. For example, some embedded devices 102 do not include monitors, others do not include a keyboard or a mouse, and some embedded devices 102 do not include either a monitor or a keyboard/mouse. Examples of embedded devices 102 include a vending machine, a telephone, a door lock, a temperature sensor, a motor, a switch, a light, a printer, a fax machine, a refrigerator, a health monitor, an elevator/escalator, a copier, a scanner, manufacturing equipment, industrial equipment, computer equipment and peripherals, security systems, monitoring equipment, and the like.

Embedded devices 102 will be discussed in detail in relation to FIG. 11. Although multiple embedded devices 102 are shown in FIG. 1, embodiments may be practiced in systems with one embedded device 102. In an alternative embodiment, the embedded devices 102 may be replaced with any computing device, including microcontrollers, hand-held computers, personal computers, servers, mainframes, supercomputers, and any variation or related device thereof. For example, embodiments may be practiced in systems which use one or more computing devices in place of the embedded devices 102. Alternatively, embodiments may be practiced in systems which use a combination of embedded devices 102 and computing devices.

The network authenticator 104 and embedded devices 102 are in electronic communication via a network 106. The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, which are formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network. In the embodiment depicted in FIG. 1, a multiple-access network 106 is provided. However, alternative embodiments may include any form of network including a point-to-point network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

As a node will typically have a physical address to distinguish it from other nodes, a node may also have various network ports to distinguish information sent to and from the node. Most network ports are identified doorways for communicating between a program and another communications system or program. Network ports may pass through a hardware port. The network port may be numbered and a standard network implementation like TCP/IP may attach a port number to data it sends. The software implementation may guard and listen at the attached port number or doorway to determine where to send data on the system. A port may send and receive data one direction at a time (simplex) or simultaneously in both directions (duplex). These network ports may also connect internal programs on a single computer system.

Figure 2:
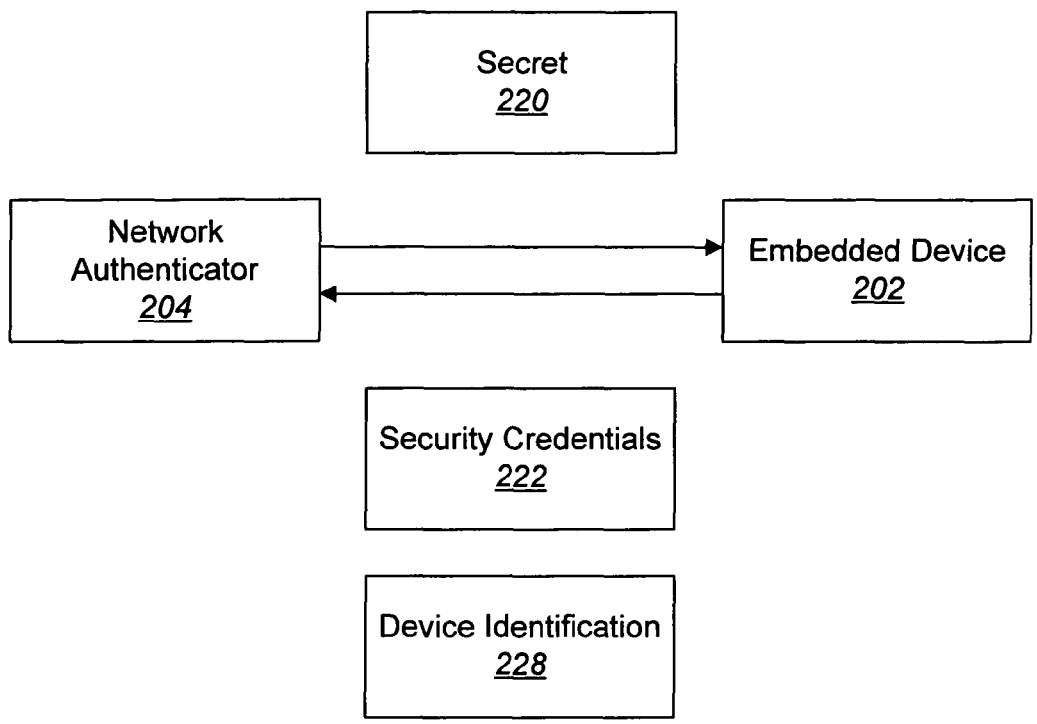
FIG. 2 is a block diagram illustrating information exchanged between a network authenticator and an embedded device according to an embodiment.

FIG. 2 is a block diagram illustrating information exchanged between a network authenticator 204 and an embedded device 202 according to an embodiment. The embedded device 202 may pass security credentials 222 and its device identification 228 to the network authenticator 204. The network authenticator 204 may verify the security credentials 222 and after generating a secret 220, record the secret 220 and the device identification 228. The secret 220 may be sent to the embedded device 202. This exchange of information will be discussed in connection with the discussion of FIGS. 6, 9, and 10 below.

Figure 3:
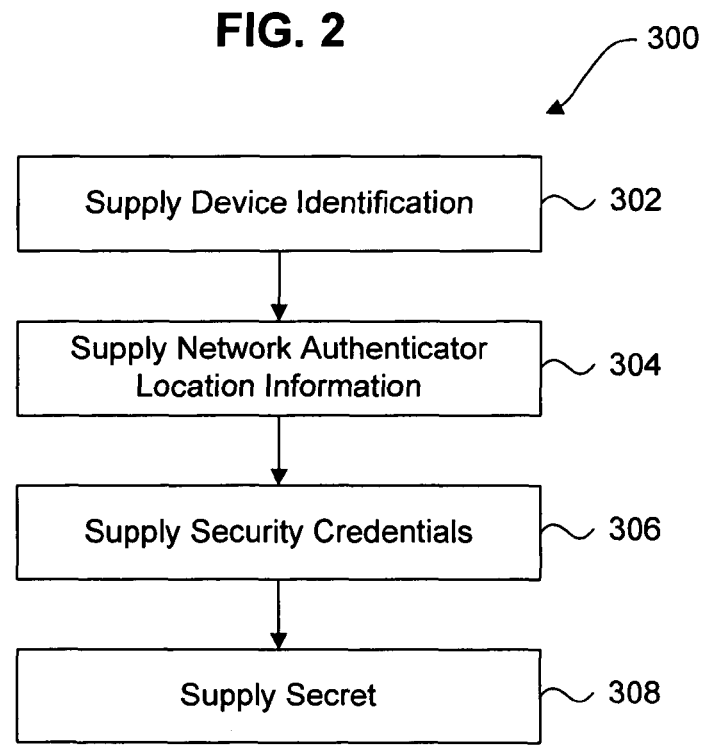
FIG. 3 is a flow diagram that illustrates one embodiment of a method for automatically generating and distributing a secret for secure systems.

FIG. 3 is a flow diagram that illustrates one embodiment of a method 300 for automatically generating and distributing a secret 220 for secure systems. In accordance with the method 300, and according to the present embodiment, a manufacturer may supply 302 a device identification 228, which is stored in the memory of the embedded device 102. In an alternative embodiment, the device identification 228 may be supplied when the embedded device 202 is first connected to the network 106. For example, in a network 106 using a DHCP server, the DHCP server may supply the embedded device 102 with a device identification 228. The device identification 228 will be discussed in more detail below.

The manufacturer supplies 304 the location information for the network authenticator 104. The location information may be stored in the memory of the embedded device 102. In an alternative embodiment, the location information may be supplied 304 by an installer. The location information for the network authenticator 104 will be discussed below.

The manufacturer supplies 306 security credentials to the embedded device 102. In an alternative embodiment, the embedded device 102, upon first operation, may request the security credentials 222. The installer may contact the manufacturer, or any entity that has the security credentials 222, to obtain the security credentials 222. The security credentials 222 may then be stored in the memory of the embedded device 102.

A network authenticator 104 and embedded device 102 negotiate to supply 308 the embedded device 102 with a secret 220. Providing 308 a secret 220 will be discussed below in connection with FIGS. 6, 9, and 10.

Figure 4:
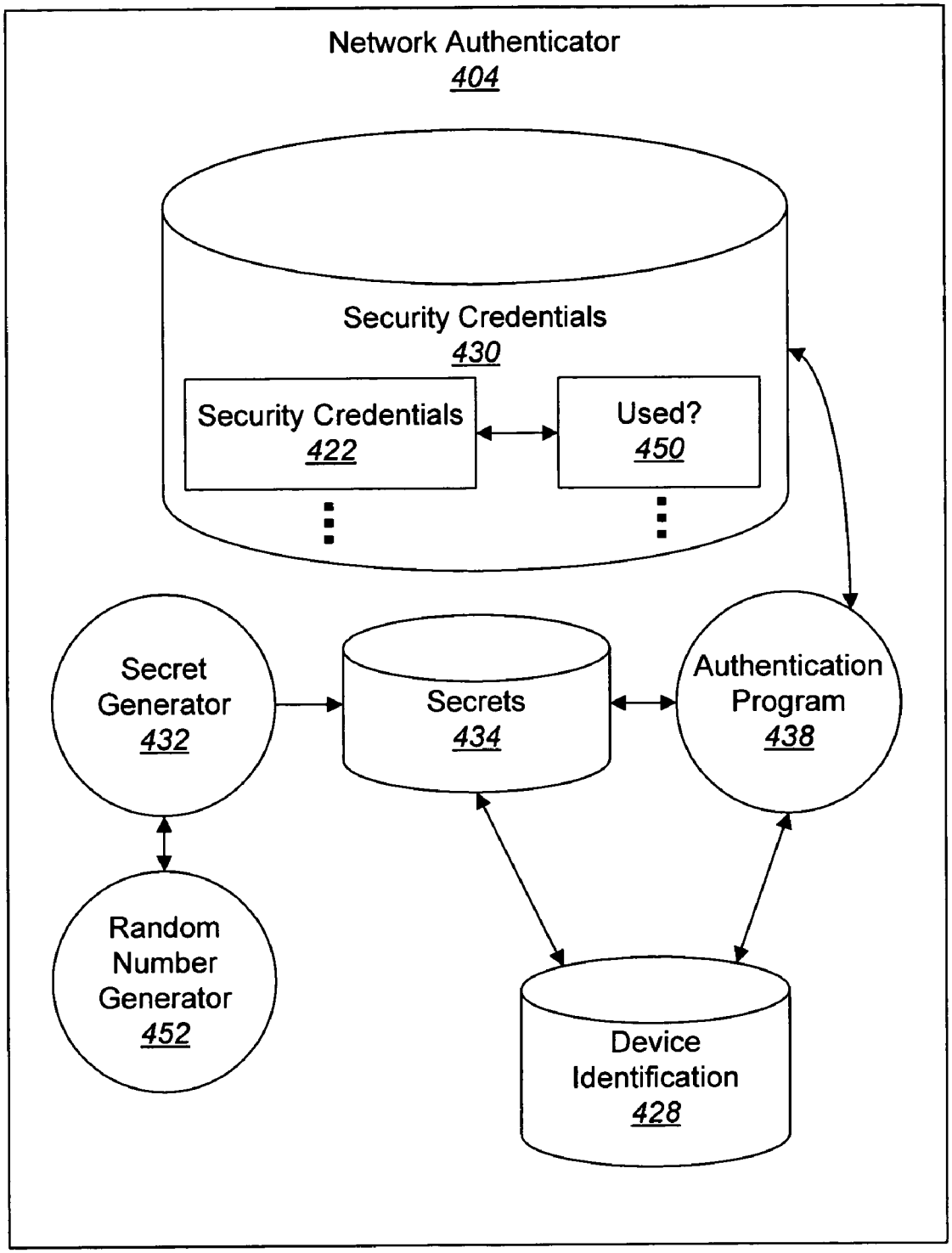
FIG. 4 is a block diagram of software components and/or data that may be used by one embodiment of a network authenticator.

FIG. 4 is a block diagram of software components and/or data that may be used by one embodiment of a network authenticator 404. A security credentials database 430 may be stored in the memory of the network authenticator 404. In the present embodiment, the security credentials database 430 includes the various security credentials 422 that a manufacturer may provide to the embedded devices 102. The security credentials database 430 may also include a flag 450 that indicates whether the security credentials 422 have been previously provided to the network authenticator 404. The network authenticator 404 may use the information stored in the security credentials database 430 to verify whether the security credentials 422 provided by an embedded device 102 are valid. Alternatively, after a set of security credentials 422 has been used, the set of security credentials 422 may be removed from the security credentials database 430.

A secret generator 432 may be stored in the memory of the network authenticator 404. The secret generator 432 may use a random number generator 452 to generate a secret 220. The random number may be any desired length. Typically, a longer random number provides higher security for the embedded device 102.

In the present embodiment, the network authenticator 404 includes a secrets database 434. The secrets database 434 may also be stored in the memory of the network authenticator 404. The secrets database 434 may store the generated secrets 220 that have been transmitted to the embedded devices 102. Additionally, the secrets database 434 may store secrets 220 that have been generated by an embedded device 102 and transmitted to the network authenticator 404. The generated secrets 220 may be stored when the network authenticator 404 registers the secret 220. In the present embodiment, the network authenticator 404 also may include a device identification database 428. The device identification database 428 may also be stored in the memory of the network authenticator. The device identification database 428 may store the device identifications 228 submitted by the embedded devices 102. The secrets database 434 and device identification database 428 may be associated such that the secret 220 and device identification 228 for an embedded device 102 are interrelated. In an alternative embodiment, the secrets database 434 and the device identification database 428 may be combined into one database such that the secret 220 and device identification 228 for an embedded device 102 are interrelated within the same database.

An authentication program 438 may also be stored in the memory of the network authenticator 404. The authentication program 438 may be configured to facilitate automatic secret generation and distribution for secure systems, as will be explained in detail below. At least some of the functionality provided by the authentication program 438 may depend on the manner in which the embedded device 102 is being used. The authentication program 438 will be discussed below.

Figure 5:
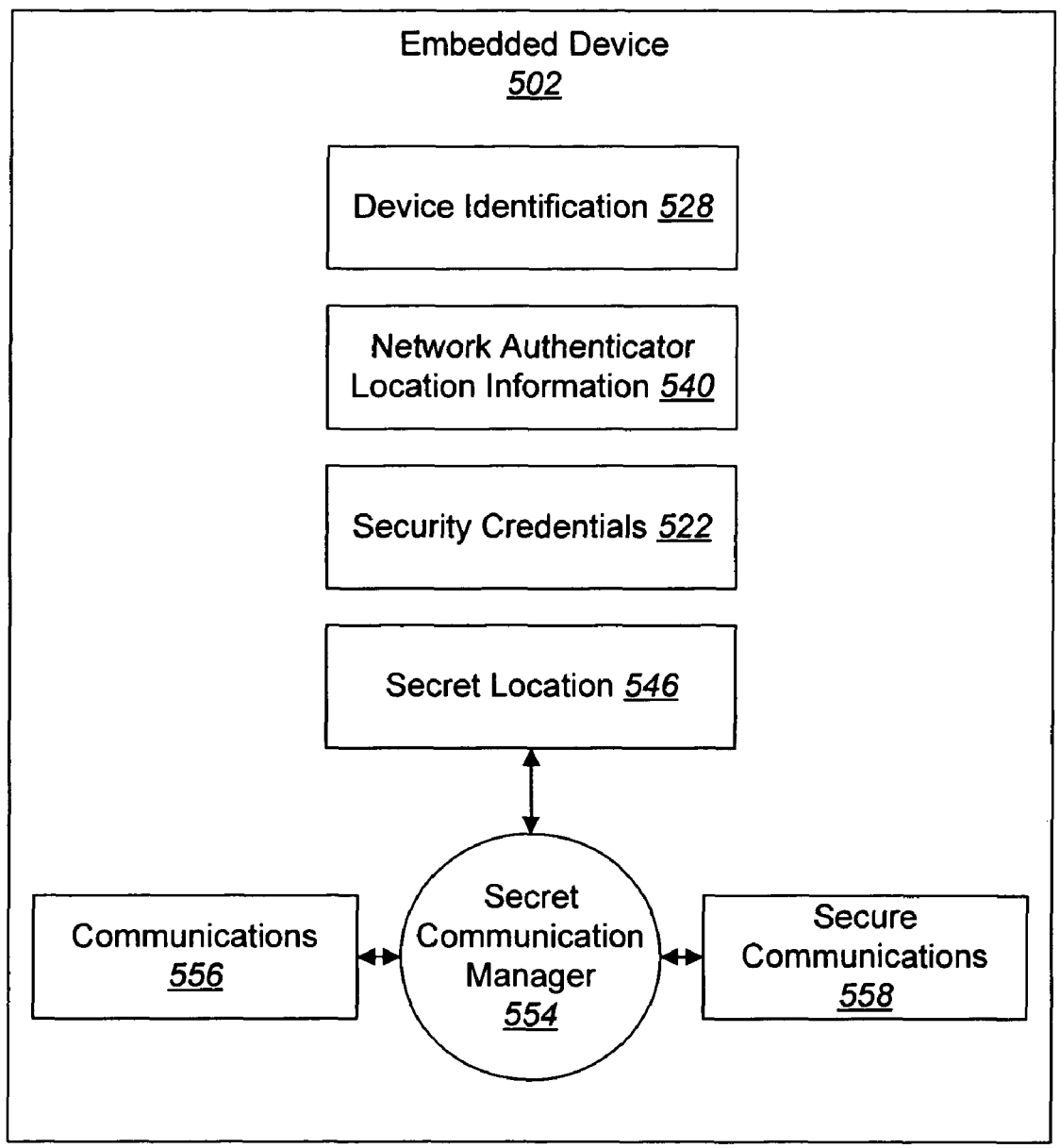
FIG. 5 is a block diagram of software components and/or data that may be used by one embodiment of an embedded device.

FIG. 5 is a block diagram of software components and/or data that may be used by one embodiment of an embedded device 502. A device identification 528 may be stored in the memory of the embedded device 502. In the present embodiment, the device identification 528 is stored in non-volatile memory. The device identification 528 uniquely identifies an embedded device 502 within the system 100. The device identification 528 may be stored during manufacturing or installation.

Location information 540 for a network authenticator may be stored in the memory of the embedded device 502. The location information 540 may enable the embedded device 502 to establish communications with a network authenticator 104, by providing information relating to the location of the network authenticator 104 on the network 106. The location information 540 may include the network address and port number of the network authenticator 104. Security credentials 522 may also be stored in the memory of the embedded device 502. These security credentials 522 may include a username and password. The security credentials 522 will be discussed below.

A secret location 546 may be designated in the memory of the embedded device 502. The secret location 546 should only be known and accessible by the embedded device 502. The secret location 546 may store a secret 220 that is provided by the network authenticator 104 or generated by the embedded device 502. The secret location 546 may also provide the stored secret 220 to a secret communication manager 554. The secret communication manager 554 uses the secret 220 to establish secure communications on the network 106. The secret communication manager 554 receives communications 556 to be transmitted over the network 106 and encrypts the communications, such that they become secure communications 558 to prevent unauthorized access. The secret communications manager 554 may also receive secure communications 558 from the network 106 and decrypt the secure communications 558 for use on the embedded device 102.

Figure 6:
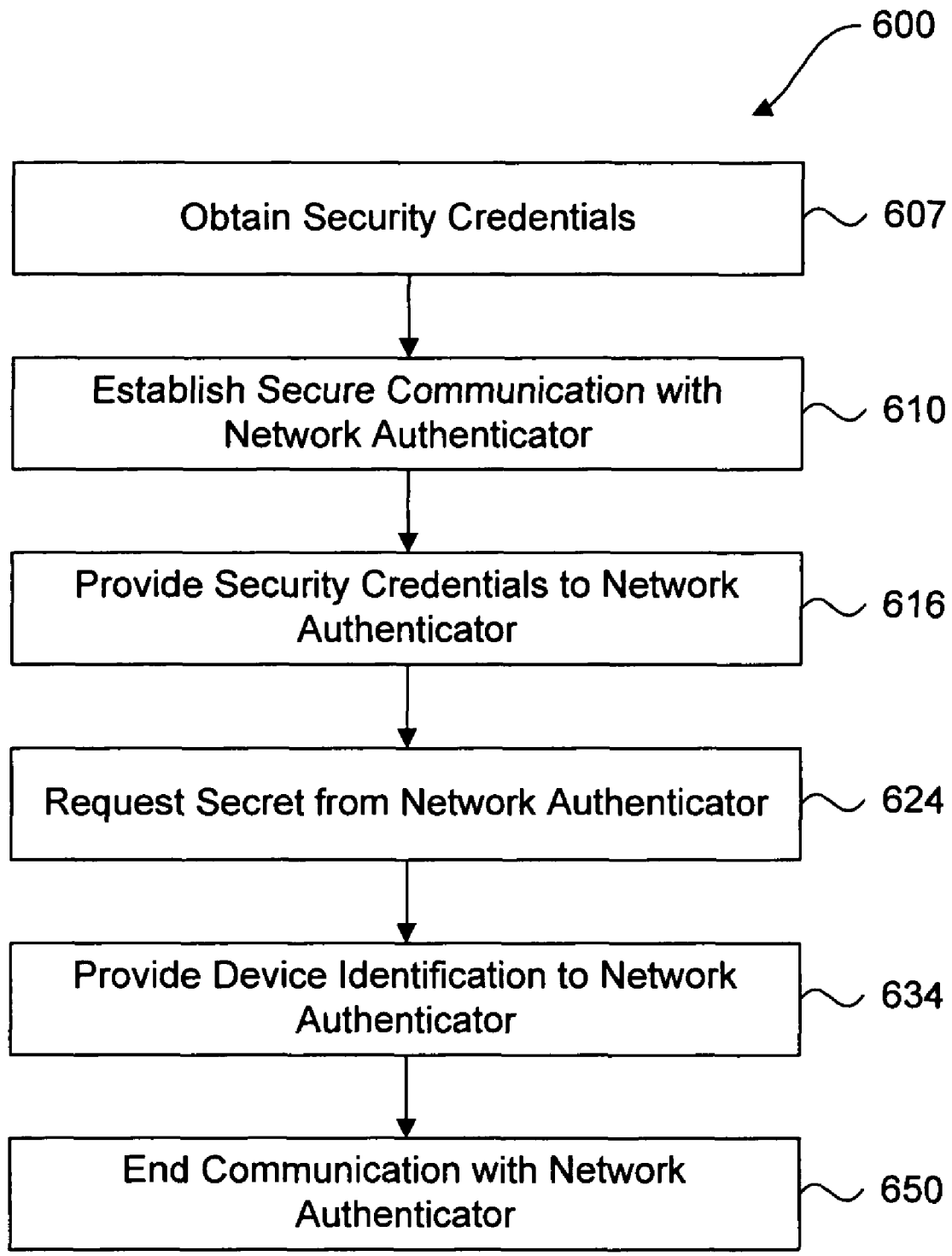
FIG. 6 is a flow diagram that illustrates one embodiment of a method for generating and distributing a secret for secure systems from the perspective of an embedded device.

FIG. 6 is a flow diagram that illustrates one embodiment of a method for generating and distributing a secret 220 for secure systems from the perspective of an embedded device 102. A discussion of the generation and distribution of a secret 220 for secure systems from the perspective of a network authenticator 104 according to an embodiment will be described below. In accordance with the method 600, the embedded device 102 obtains 607 security credentials from a manufacturer or other source.

The embedded device 102 may establish 610 secure communication with the network authenticator 104. In order to communicate with the network authenticator 104, the embedded device 102 may obtain the location from the location information 540. In one embodiment, the location information 540 may be a network address and port number. In an alternative embodiment the location information 540 may be an IP address with a specific port number. Alternatively, the network authenticator 104 may establish secure communication with the embedded device. For example, the network authenticator 104 may know the location of the embedded device 102 and initialize the communication. The process used to establish 610 secure communication with the network authenticator may utilize the embedded device's 102 security credentials 222. It must not be possible, using the security credentials 222, to intercept and decrypt the communications between the embedded device 102 and the network authenticator 104.

The embedded device 102 provides 616 the network authenticator 104 with its security credentials 222. In the present embodiment, the security credentials 222 include a username and password, which were provided during manufacturing. In an alternative embodiment, the embedded device 102, upon first operation, may request the security credentials 222. The installer may contact the manufacturer, or any entity that has the security credentials 222, to obtain the security credentials 222. The installer may provide the security credentials 222 to the embedded device 102, which may then store the security credentials 222 in the memory of the embedded device 102.

The embedded device 102 requests 624 a secret 220 from the network authenticator 104. The generation and distribution of the secret 220 by a network authenticator 104 will be discussed below.

The embedded device provides 634 its device identification 228 to the network authenticator 104. The network authenticator 104 may use the device identification 228 to register the requested secret. Secret registration will be discussed below.

The embedded device 102 ends 650 communication with the network authenticator 104. In the present embodiment, the embedded device 102 ends 650 communication by closing the secure communications channel with the network authenticator 104. In an alternative embodiment, the network authenticator 104 may end 650 communication with the embedded device 102. In a further embodiment, the network authenticator 104 may end 650 communication by closing the secure communications channel.

Figure 7:
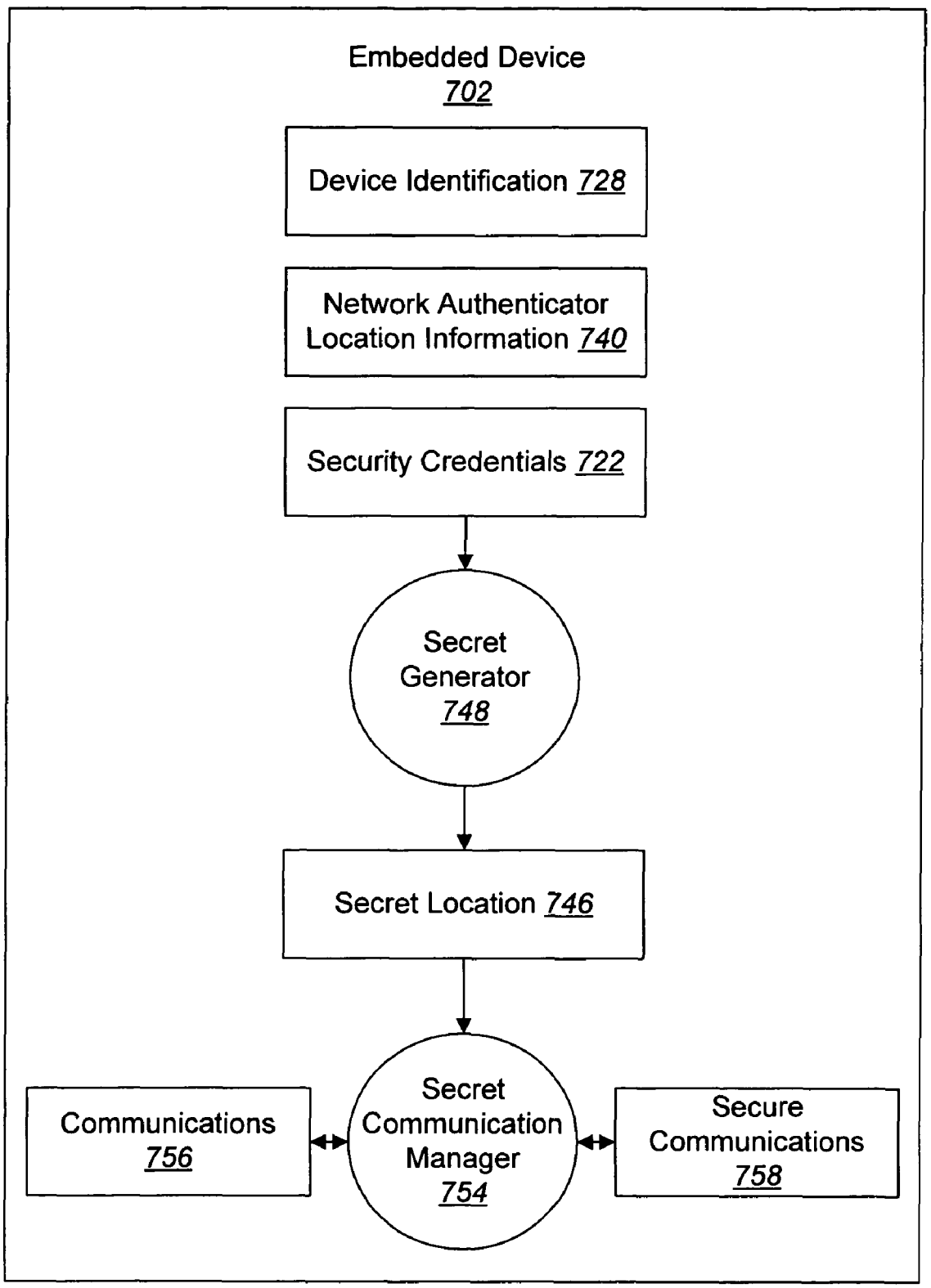
FIG. 7 is a block diagram of software components and/or data that may be used by another embodiment of an embedded device.

FIG. 7 is a block diagram of software components and/or data that may be used by another embodiment of an embedded device 702. As with the previously described embodiment, the embedded device 702 shown in FIG. 7 includes device identification 728, location information 740 for the network authenticator 104, security credentials 722 for the embedded device 702, and a secret location 746. The embedded device 702 may also include a secret communication manager 754. The secret communication manager 754 may use the secret 220 to establish 758 secure communications over the network 106. The secret communication manager may convert communications 756 to secure communications 758 and vice versa. The embedded device 702 also includes a secret generator 748. The secret generator 748 will be discussed below.

Figure 8:
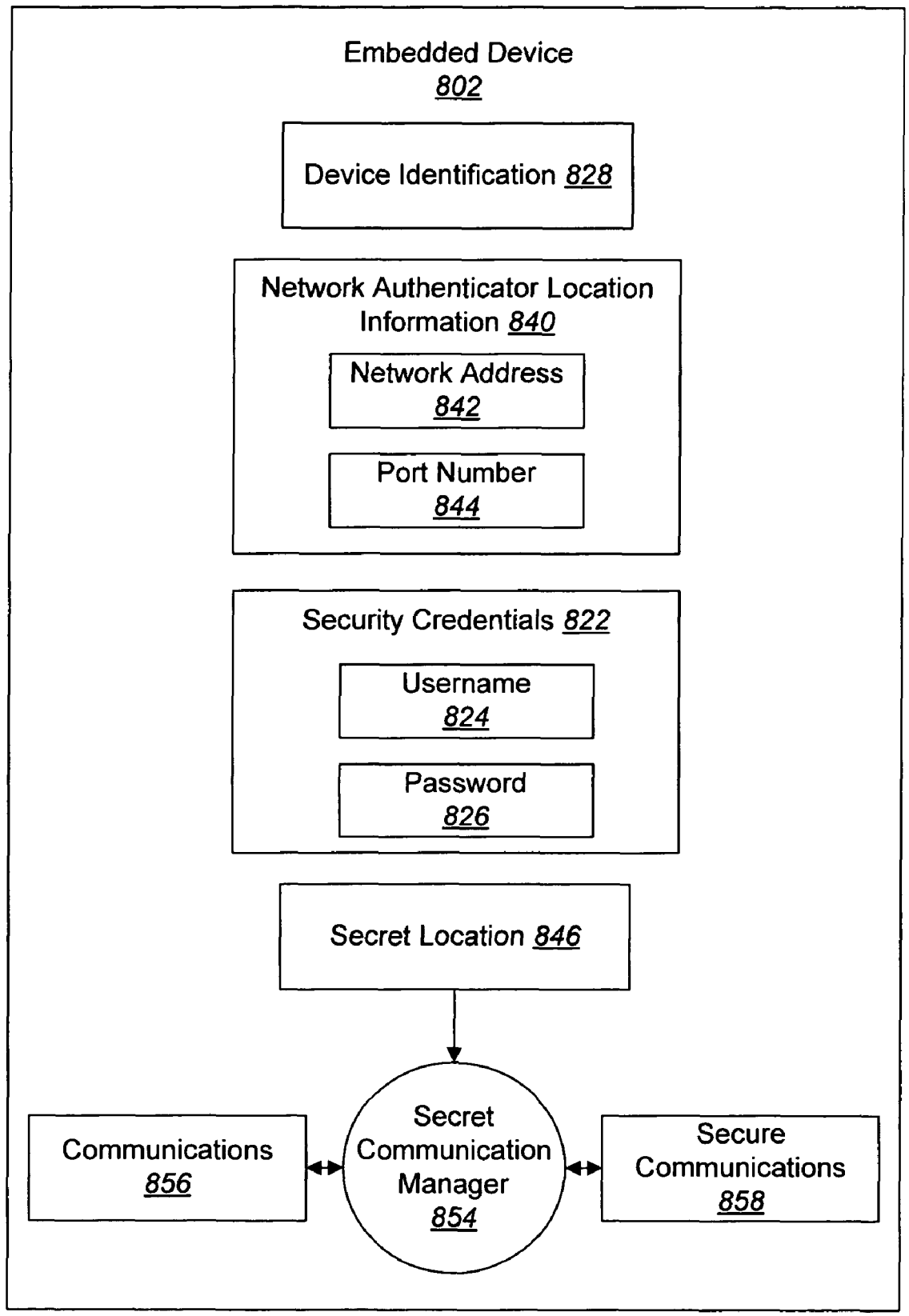
FIG. 8 is a block diagram of software components and/or data that may be used by a further embodiment of an embedded device.

FIG. 8 is a block diagram of software components and/or data that may be used by a further embodiment of an embedded device 802. As with the embodiments described previously, the embedded device 802 shown in FIG. 8 may include device identification 828, location information 840 for the network authenticator 104, security credentials 822 for the embedded device 802, a secret location 846, a secret communication manager 854, and both communications 856 and secure communications 858. The location information 840 of the present embodiment includes a network address 842 and a port number 844 for the network authenticator. The security credentials 822, in the present embodiment, also include a username 824 and password 826 stored in the memory 812 of the embedded device 802.

Figure 9:
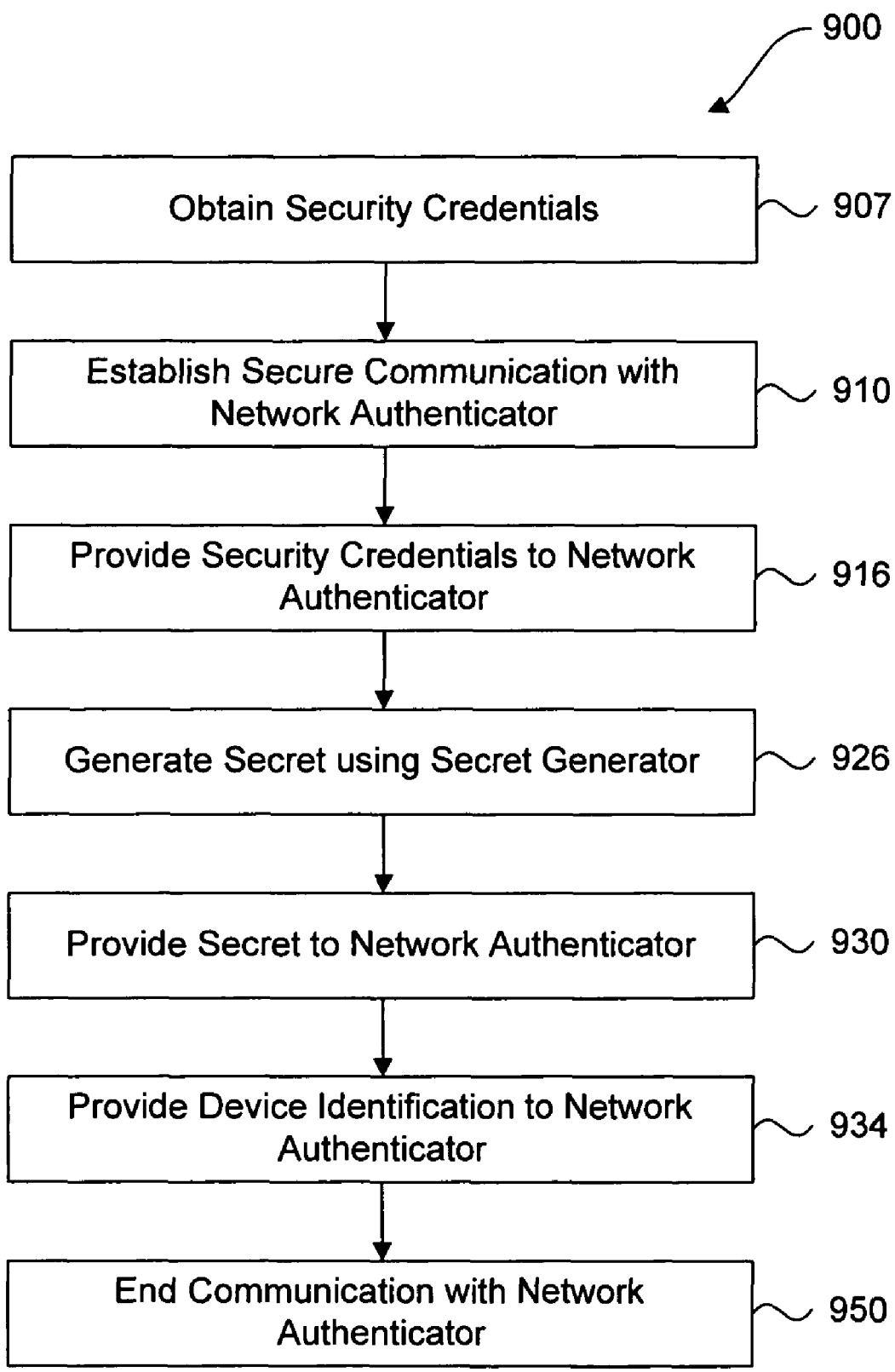
FIG. 9 is a flow diagram that illustrates another embodiment of a method for generating and distributing a secret for secure systems from the perspective of an embedded device.

FIG. 9 is a flow diagram that illustrates another embodiment of a method for generating and distributing a secret 220 for secure systems from the perspective of an embedded device 102. As with the embodiment described previously, the method 900 illustrated in FIG. 9 involves obtaining 907 security credentials from a manufacturer or other source, establishing 910 secure communication with the network authenticator 104 and providing 916 the network authenticator 104 with the embedded device's security credentials 222. The method 900 may also involve generating 926 a secret. In accordance with the present embodiment, the embedded device 102 may include a secret generator 748.

A secret generator 748 may provide the embedded device 102 with the ability to generate a secret 220. The secret generator 748 may generate a secret 220 at any time prior to registration of the secret 220 with the network authenticator 104. In the present embodiment, the secret generator 748 generates a random number.

The embedded device provides 930 the secret 220 to the network authenticator 104. In the embodiment of FIG. 6, the embedded device 502, 802 requests a secret 220 from the network authenticator 104, because these embedded devices 502, 802 typically do not have a secret generator 748 stored in memory. In the present embodiment of FIG. 7, the embedded device 702 does have a secret generator 748 stored in memory and therefore may generate 926 its own secret 220. In an alternative embodiment, the embedded device 702 may request a secret 220 from the network authenticator 104, despite being capable of generating 926 its own secret 220.

As with the embodiment described previously, the method 900 illustrated in FIG. 9 involves providing 934 the device identification 228 for the embedded device 102 to the network authenticator 104. Similar to the previously described embodiment, in the present embodiment the network authenticator 104 may use the device identification 228 to register the provided 930 secret 220. However, the network authenticator 104 as in the previously described embodiment may also register a secret 220 that is requested 930 by the embedded device 102 rather than provided by the embedded device.

Also like the previously described embodiment, the present embodiment includes ending 950 communication with the network authenticator 104. In the present embodiment, the embedded device 102 ends 950 communication by closing the secure communications channel with the network authenticator 104. As mentioned above, in an alternative embodiment, the network authenticator 104 may end 950 communication with the embedded device 102. In a further embodiment, the network authenticator 104 may end 950 communication by closing the secure communications channel.

Figure 10:
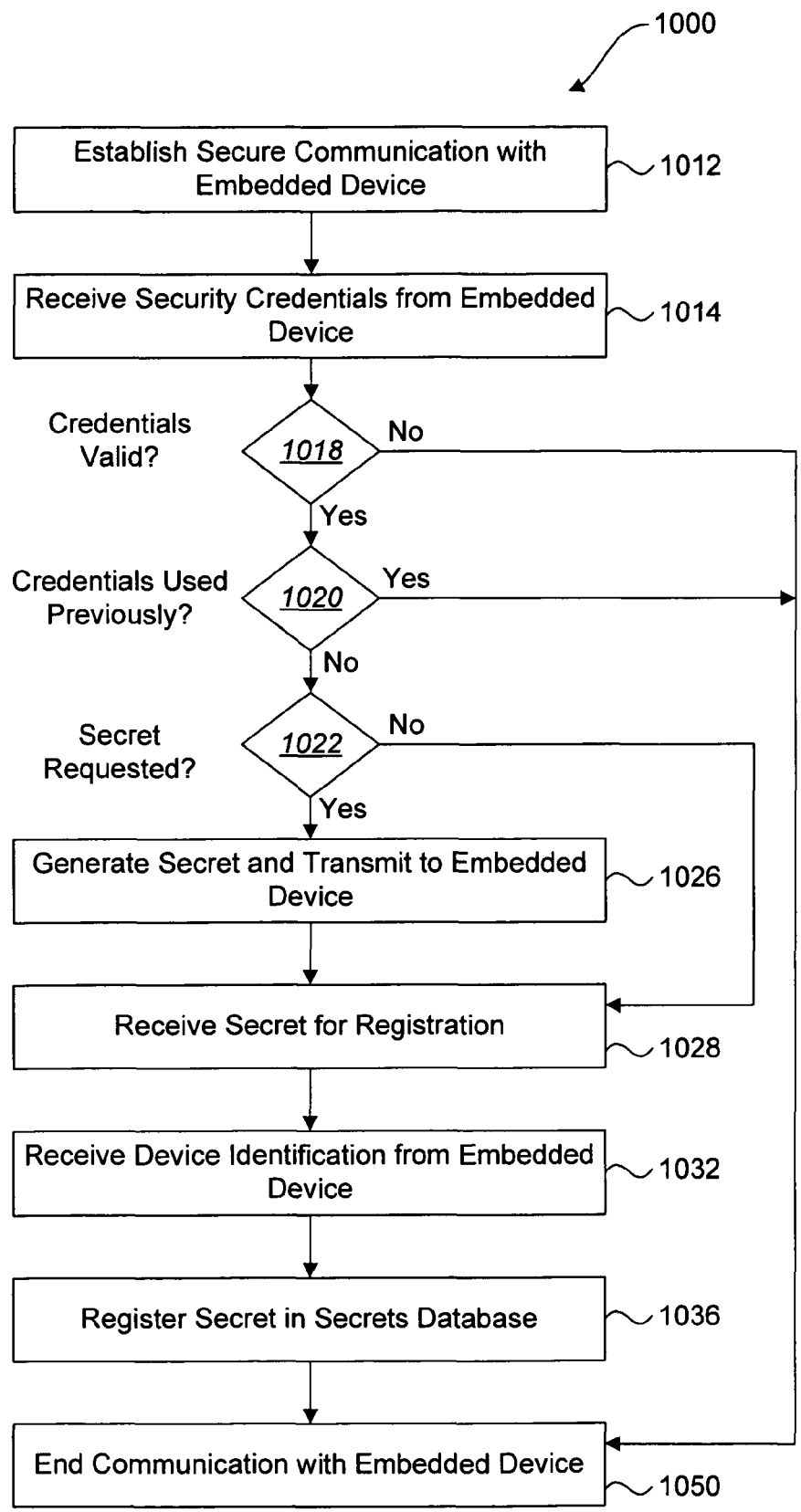
FIG. 10 is a flow diagram that illustrates the operation of one embodiment of an authentication program that facilitates generation and distribution of a secret for secure systems from the perspective of a network authenticator.

FIG. 10 is a flow diagram that illustrates the operation of one embodiment of an authentication program 438 that facilitates generation and distribution of a secret 220 for secure systems from the perspective of a network authenticator 104. In accordance with the method 1000, the network authenticator 104 establishes 1012 secure communication with the embedded device 102. In the present embodiment, the established communication is a secure communications channel between the embedded device 102 and the network authenticator 104.

The authentication program 438 receives 1014 the security credentials 222 from the embedded device 102. These security credentials 222 may include a username 824 and password 826. The security credentials 222 may be used to establish the secure communications channel, in which case, it should not be possible to intercept and decrypt the communications on the channel using the security credentials.

The authentication program 438 determines 1018 whether the provided security credentials 222 are valid. This may be accomplished by comparing the provided security credentials 222 with the security credentials 422 stored in the security credentials database 430. If the authentication program 438 determines 1018 that the security credentials 222 are valid, the authentication program 438 may continue. Otherwise, the authentication program 438 may end 1050 communication with the embedded device 102. In the present embodiment, the authentication program 438 ends 1050 communication by closing the secure communications channel with the embedded device 102. In an alternative embodiment, the embedded device 102 may end 1050 communication with the network authenticator 104. In a further embodiment, the embedded device 102 may end 1050 communication by closing the secure communications channel.

The security credentials 222 may be used to establish a secure communications channel between the embedded device 102 and the network authenticator 104. The secure communications channel may limit the installer or the embedded device's access to the network authenticator 104. For example, the access may be limited to only secret generation 1026 and secret registration 1036. Additionally, access to the secure communications channel may also be limited to a one-time usage of the security credentials 222, as will be discussed below.

The authentication program 438 determines 1020 whether the security credentials 222 have been used previously. As discussed above, the security credentials database 430 may contain a list of all valid security credentials 422. As a security measure, the present embodiment includes a one-time use restriction, which may prevent potential security breaches by limiting the security credentials 422 to one use. After the security credentials 422 have been used, the network authenticator 104 may prevent the embedded device 102 from requesting 624 or providing 930 a new secret 220. In an alternative embodiment, the security credentials 422 stored in the security credentials database 430 may have an associated flag 450 that indicates a prior use. This one-time use restriction may also prevent an installer from using the security credentials 222 from an embedded device 102 with an alternative device to obtain the secret 220. For example, if the installer uses an alternative device to imitate an embedded device 102 and uses the security credentials 222 on the embedded device 102 to get a secret 220, the installer only has the secret 220 and cannot use the embedded device 102 because the secret 220 has not been stored in the memory of the embedded device 102. The installer may be prevented from storing the secret 220 in the memory of the embedded device 102, because the installer may not know the secret location 546 where the secret 220 is stored in the memory. Additionally, because the installer has already used the security credentials 222, the installer may not reuse the security credentials 222 to obtain the secret 220. Obscuring the secret location 546 in the memory of the embedded device 120 may prevent an installer from obtaining a secret 220 and using it in an embedded device 102. To further protect the secret 220 from access by the installer, the embedded device's security credentials 222 can be obscured from the installer by setting the security credentials 222 when the embedded device 102 is manufactured.

If the authentication program 438 determines 1020 that the security credentials 222 have not been used previously, the authentication program 438 may continue. Otherwise, the authentication program 438 may end 1050 communication with the embedded device 102. Limiting the security credentials 222 to a one-time use may prevent an embedded device 102 from generating 1026 a secret 220 for the embedded device 102 and registering 1036 the secret 220 on the network authenticator 104 and then have the installer reuse the security credentials 222 to obtain the registered secret 220.

The authentication program 438 determines 1022 whether the embedded device 102 has requested a secret 220. As discussed above, some embedded device embodiments may not be capable of generating 926 a secret 220. These embedded devices 102 may request 624 a secret 220 from the network authenticator 104. Alternative embedded device embodiments may include their own secret generator 748. These embedded devices may not request 624 a secret 220 because they are capable of generating 926 their own secret 220. Alternatively, these embedded devices 102 may still request 624 a secret 220 despite having secret generating capability. If the authentication program 438 determines 1022 that a secret 220 is requested 624, the authentication program 438 may generate 1026 a secret 220. If the authentication program 438 determines 1022 that a secret 220 is not requested, the authentication program 438 will receive 1028 the secret 220, as will be described below.

The authentication program 438 generates 1026 a secret 220. The authentication program 438 may use its secret generator 432 to generate 1026 a secret 220. In the present embodiment, the random number generator 452 generates a random number for a secret 220. The network authenticator 104 transmits the secret 220 to the embedded device 102 and the embedded device 102 stores the secret 220 in the designated secret location 546. This may prevent an installer from obtaining the secret 220 and then storing it in the embedded device 102, as discussed above.

The authentication program 438 receives 1028 the secret. In the alternative embodiment discussed above in connection with FIG. 7, the embedded device 702 has a secret generator 748 and is capable of generating 926 its own secret 220. In these situations, the embedded device 702 may generate 926 its own secret 220 or may request 624 a secret 220 from the network authenticator 104. For example, the embedded device 702 may generate 926 a secret 220 and provide the secret 930 to the network authenticator 104. The network authenticator 104 may take the secret 220 that was generated 926 by the embedded device 702 and mathematically combine it with a secret 220 generated 1026 by the network authenticator 104, or any combinations of data stored on the embedded device 102 or network authenticator 104.

The network authenticator 104 receives 1032 the device identification 228 from the embedded device 102. As discussed above, the device identification 228 must uniquely identify the embedded device 102 within the system 100.

The network authenticator 104 registers 1036 the secret 220. In the present embodiment, the network authenticator 104 registers 1036 the secret 220 using the device identification 228 for the embedded device 102. This may be performed by storing the secret 220 in the secrets database 434, storing the device identification 228 in the device identification database 428, and then associating the secret 220 stored in the secrets database 434 for the embedded device 102 with the device identification 228 stored in the device identification database 428 such that the secret 220 and device identification 228 for an embedded device 102 are interrelated. In an alternative embodiment, the secrets database 434 and the device identification database 428 may be combined into one database such that the secret 220 and device identification 228 for an embedded device 102 are interrelated and stored within the same database. Registering 1036 the secret 220 and device identification 228 facilitates using the secret 220 to establish a secure system by allowing communications 556 to be encrypted by a secret communications manager 554 and sent over the network 106 as secure communications 558 and decrypted at a secure node in the system 100.

As described above the network authenticator 104 may end 1050 communication with the embedded device 102. The network authenticator 104, in the present embodiment, ends 1050 communication by closing the secure communications channel with the embedded device 102. In an alternative embodiment, the embedded device 102 may end 1050 communication with the network authenticator 104. In a further embodiment, the embedded device 102 may end 1050 communication by closing the secure communications channel.

Figure 11:
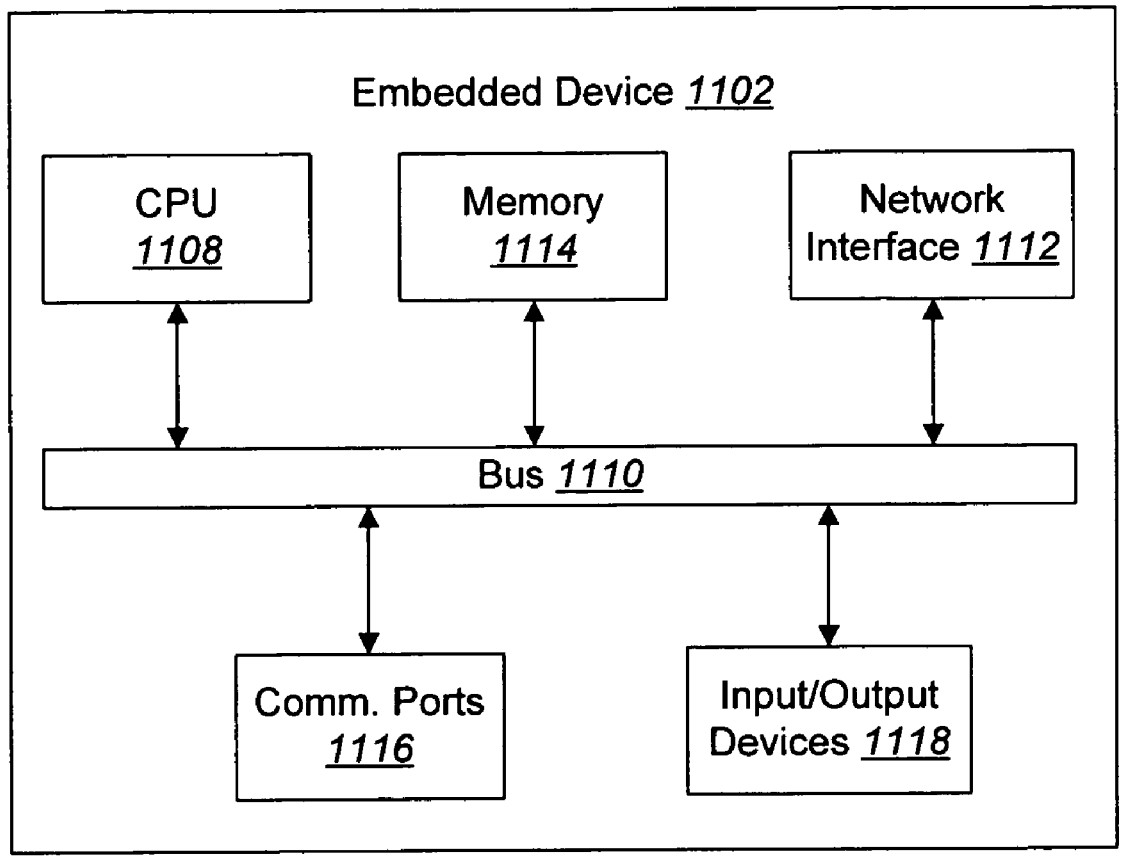
FIG. 11 is a block diagram of hardware components that may be used in an embedded device that is configured according to an embodiment.

FIG. 11 is a block diagram of hardware components that may be used in an embedded device 1102 that is configured according to an embodiment. A central processing unit (CPU) 1108 or processor may be provided to control the operation of the embedded device 1102, including the other components thereof, which are coupled to the CPU 1108 via a bus 1110. The CPU 1108 may be embodied as a microprocessor, microcontroller, digital signal processor or other device known in the art. The CPU 1108 performs logical and arithmetic operations based on program code stored within the memory. In certain embodiments, the memory 1114 may be on-board memory included with the CPU 1108. For example, microcontrollers often include a certain amount of on-board memory.

The embedded device 1102 may also include a network interface 1112. The network interface 1112 facilitates communication between the embedded device 1102 and other devices connected to the network 106, which may be a pager network, a cellular network, a global communications network, the Internet, a computer network, a telephone network, etc. The network interface 1112 operates according to standard protocols for the applicable network 106.

The embedded device 1102 may also include memory 1114. The memory 1114 may include random access memory (RAM) for storing temporary data. Alternatively, or in addition, the memory 1114 may include read-only memory (ROM) for storing more permanent data, such as fixed code and configuration data. The memory 1114 may also be embodied as a non-volatile storage device, such as a hard disk drive. The memory 1114 may be any type of electronic device capable of storing electronic information.

The embedded device 1102 may also include one or more communication ports 1116, which facilitate communication with other devices. The embedded device 1102 may also include input/output devices 1118, such as a keyboard, a mouse, a joystick, a touchscreen, a monitor, speakers, a printer, etc.

Of course, FIG. 11 illustrates only one possible configuration of an embedded device 1102. Various other architectures and components may be utilized.

Figure 12:
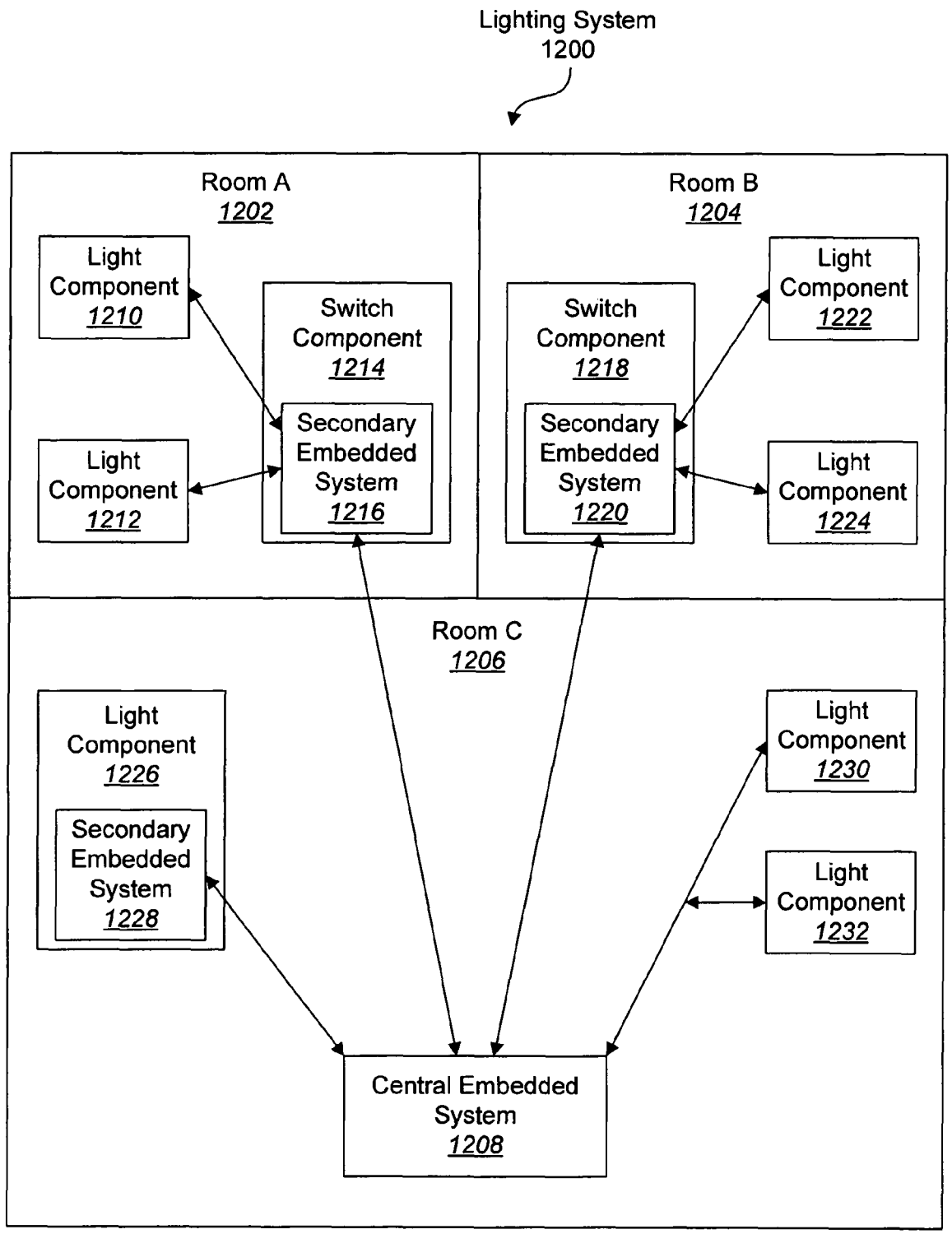
FIG. 12 illustrates an exemplary lighting system in which the present systems and methods may be implemented.

The present systems and methods may be used in several contexts. FIG. 12 illustrates one embodiment of a system wherein the present systems and methods may be implemented. FIG. 12 is a block diagram that illustrates one embodiment of a lighting system 1200 that includes a lighting controller system 1208. The lighting system 1200 of FIG. 12 may be incorporated in various rooms in a home. As illustrated, the system 1200 includes a room A 1202, a room B 1204, and a room C 1206. Although three rooms are shown in FIG. 12, the system 1200 may be implemented in any number and variety of rooms within a home, dwelling, or other environment.

The lighting controller system 1208 may monitor and control additional embedded systems and components within the system 1200. In one embodiment, the room A 1202 and the room B 1204 each include a switch component 1214, 1218. The switch components 1214, 1218 may also include a secondary embedded system 1216, 1220. The secondary embedded systems 1216, 1220 may receive instructions from the lighting controller system 1208. The secondary embedded systems 1216, 1220 may then execute these instructions. The instructions may include powering on or powering off various light components 1210, 1212, 1222, and 1224. The instructions may also include dimming the brightness or increasing the brightness of the various light components 1210, 1212, 1222, and 1224. The instructions may further include arranging the brightness of the light components 1210, 1212, 1222, and 1224 in various patterns. The secondary embedded systems 1216, 1220 facilitate the lighting controller system 1208 to monitor and control each light component 1210, 1212, 1222, and 1224 located in the room A 1202 and the room B 1204.

The lighting controller system 1208 might also provide instructions directly to a light component 1226 that includes a secondary embedded system 1228 in the depicted room C 1206. The lighting controller system 1208 may instruct the secondary embedded system 1228 to power down or power up the individual light component 1226. Similarly, the instructions received from the lighting controller system 1208 may include dimming the brightness or increasing the brightness of the individual light component 1226.

The lighting controller system 1208 may also monitor and provide instructions directly to individual light components 1230 and 1232 within the system 1200. These instructions may include similar instructions as described previously.

Figure 13:
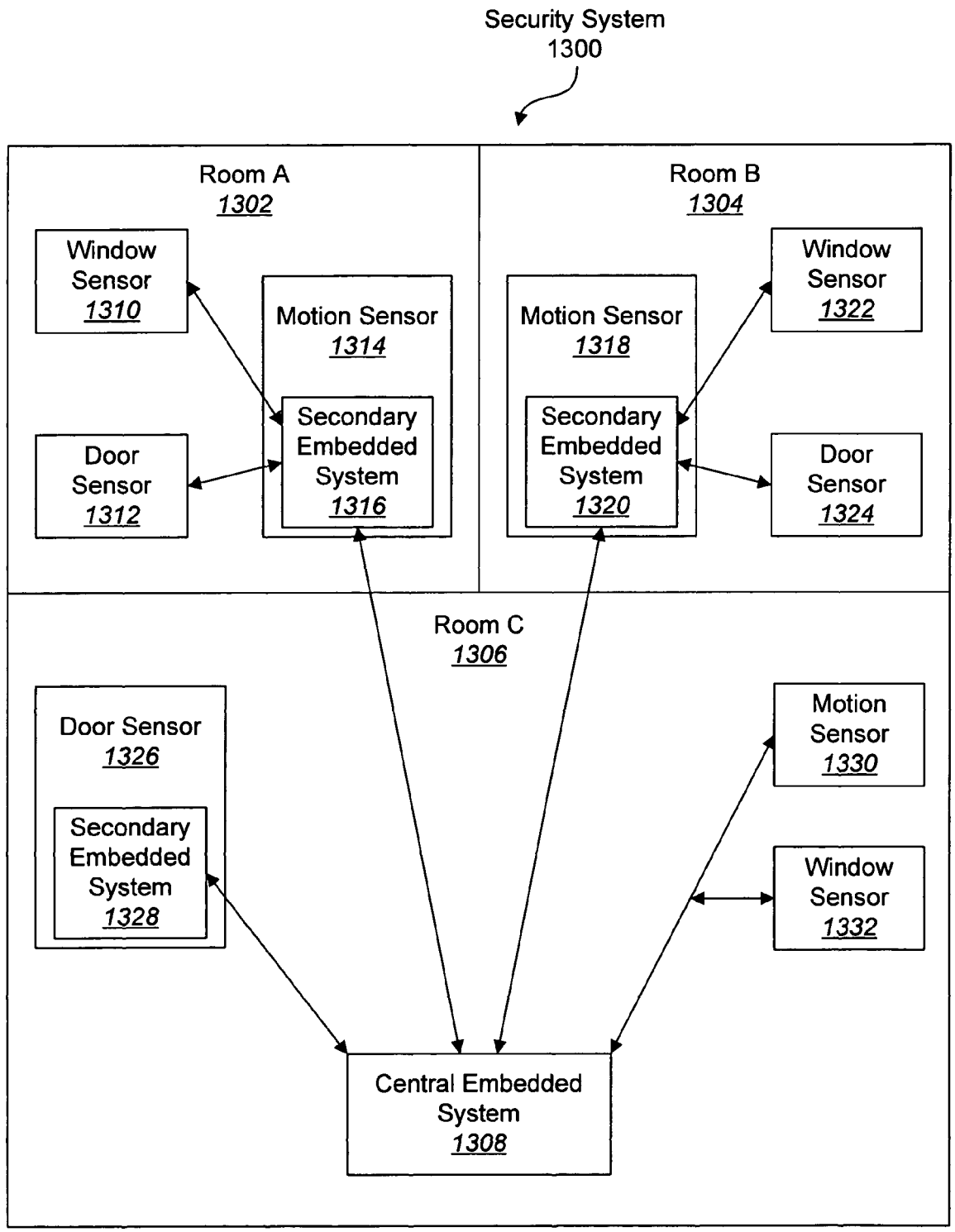
FIG. 13 illustrates an exemplary security system in which the present systems and methods may be implemented.

FIG. 13 is an additional embodiment of a system wherein the present systems and methods of the present invention may be implemented. FIG. 13 is a block diagram illustrating a security system 1300. The security system 1300 in the depicted embodiment is implemented in a room A 1302, a room B 1304, and a room C 1306. These rooms may be in the confines of a home or other enclosed environment. The system 1300 may also be implemented in an open environment where the rooms A, B and C, 1302, 1304, and 1306 respectively represent territories or boundaries.

The system 1300 includes a security controller system 1308. The security controller system 1308 monitors and receives information from the various components within the system 1300. For example, a motion sensor 1314, 1318 may include a secondary embedded system 1316. The motion sensors 1314, 1318 may monitor an immediate space for motion and alert the security controller system 1308 when motion is detected via the secondary embedded system 1316, 1320. The security controller system 1308 may also provide instructions to the various components within the system 1300. For example, the security controller system 1308 may provide instructions to the secondary embedded systems 1316, 1320 to power up or power down a window sensor 1310, 1322 and a door sensor 1312, 1324. In one embodiment, the secondary embedded systems 1316, 1320 notify the security controller system 1308 when the window sensors 1310, 1322 detect movement of a window. Similarly, the secondary embedded systems 1316, 1320 notify the security controller system 1308 when the door sensors 1312, 1324 detect movement of a door. The secondary embedded systems 1316, 1320 may instruct the motion sensors 1314, 1318 to activate the LED (not shown) located within the motion sensors 1314, 1318.

The security controller system 1308 may also monitor and provide instructions directly to individual components within the system 1300. For example, the security controller system 1308 may monitor and provide instructions to power up or power down to a motion sensor 1330 or a window sensor 1332. The security controller system 1308 may also instruct the motion sensor 1330 and the window sensor 1332 to activate the LED (not shown) or audio alert notifications within the sensors 1330 and 1332.

Each individual component comprising the system 1300 may also include a secondary embedded system. For example, FIG. 13 illustrates a door sensor 1326 including a secondary embedded system 1328. The security controller system 1308 may monitor and provide instructions to the secondary embedded system 1328 in a similar manner as previously described.

Figure 14:
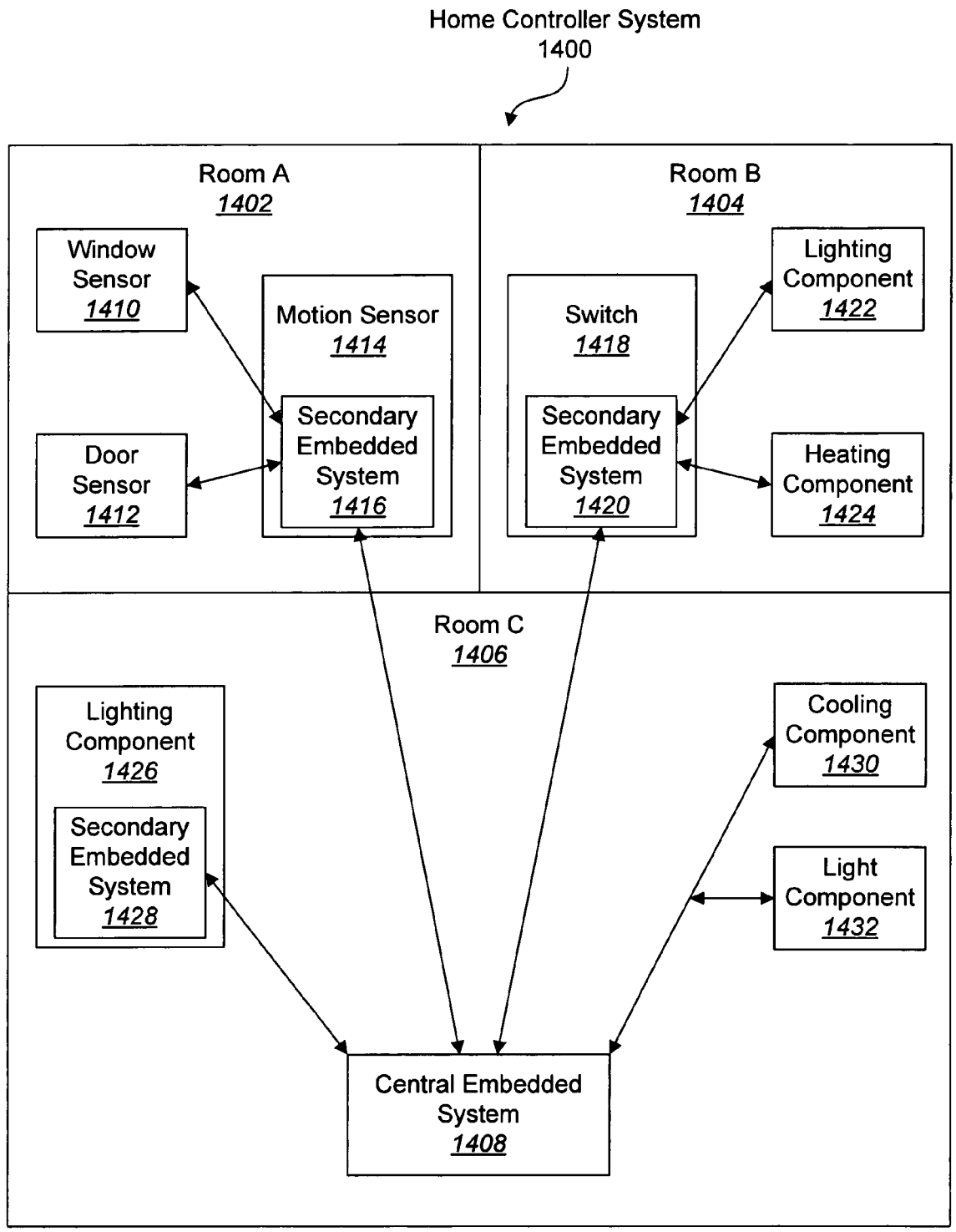
FIG. 14 illustrates an exemplary home controller system in which the present systems and methods may be implemented.

FIG. 14 is a block diagram illustrating one embodiment of a home control system 1400. The home control system 1400 includes a home controller 1408 that facilitates the monitoring of various systems such as the lighting system 1200, the security system 1300, and the like. The home control system 1400 allows an installer to control various components and systems through one or more embedded systems. In one embodiment, the home controller system 1408 monitors and provides information in the same manner as previously described in relation to FIGS. 12 and 13. In the depicted embodiment, the home controller 1408 provides instructions to a heating component 1424 via a secondary embedded system 1420. The heating component 1424 may include a furnace or other heating device typically found in resident locations or offices. The home controller system 1408 may provide instructions to power up or power down the heating component 1424 via the secondary embedded system 1420.

Similarly, the home controller 1408 may monitor and provide instructions directly to a component within the home control system 1400 such as a cooling component 1430. The cooling component 1430 may include an air conditioner or other cooling device typically found in resident locations or offices. The central home controller 1408 may instruct the cooling component 1430 to power up or power down depending on the temperature reading collected by the central embedded system 1408. The home control system 1400 functions in a similar manner as previously described in relation to FIGS. 12 and 13.

The exemplary embodiments presented above have been presented using embedded devices. These embodiments may also function using any computing device. For example, any device that includes a digital processor capable of receiving and processing data, such as microcontrollers, hand-held computers, personal computers, servers, mainframes, supercomputers, and any variation or related device thereof may be used in place of an embedded device.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for automatic secret generation and distribution for secure systems, the method being implemented by an authentication program on a network authenticator, the method comprising: establishing a secure communication channel with an embedded; receiving valid security credentials from the embedded device; determining whether the security credentials have previously been provided to the network authenticator; closing the secure communication channel with the embedded device when it is determined that the security credentials have previously been provided to the network authenticator more than once; receiving from the embedded device via the secure communication channel either a secret for the embedded device or a request to generate the secret for the embedded device only when it is determined that the security credentials have not previously been provided to the network authenticator, wherein the secret enables authentication of the embedded device to other devices within a secure system; generating the secret and transmitting the secret to the embedded device when the network authenticator receives the request to generate the secret; receiving device identification from the embedded device, wherein the device identification is received after the secret has been received by the network authenticator or after the secret has been generated by the network authenticator and transmitted to the embedded device; registering the secret for the embedded device using the device identification for the embedded device; and ending communication with the embedded device.

2. The method of claim 1, wherein the network authenticator receives the request to generate the secret for the embedded device.

3. The method of claim 2, wherein the secret is transmitted to the embedded device via the secure communication channel.

4. The method of claim 1, wherein the network authenticator receives the secret for the embedded device, and wherein the secret was generated by the embedded device.

5. The method of claim 4, wherein the secret is obtained from a secret location at the embedded device that is only known and accessible by the embedded device.

6. The method of claim 1, wherein registering the secret comprises associating the secret with the device identification.

7. The method of claim 1, wherein the secure communications channel allows access to the network authenticator only for secret registration.

8. The method of claim 7, wherein the communication is discontinued by terminating the secure communication channel such that there is no longer communications between the network authenticator and the embedded device.

9. A network authenticator that is configured for automatic secret generation and distribution for secure systems, the network authenticator comprising: a processor; memory in electronic communication with the processor; instructions stored in the memory, the instructions being executable to: establish a secure communication channel with an embedded device; receive valid security credentials from the embedded device; determine whether the security credentials have previously been provided to the network authenticator; closing the secure communication channel with the embedded device when it is determined that the security credentials have previously been provided to the network authenticator more than once; receive from the embedded device via the secure communication channel either a secret for the embedded device or a request to generate the secret for the embedded device only when it is determined that the security credentials have not previously been provided to the network authenticator, wherein the secret enables authentication of the embedded device to other devices within a secure system; generate the secret and transmit the secret to the embedded device when the network authenticator receives the request to generate the secret; receive device identification from the embedded device, wherein the device identification is received after the secret has been received by the network authenticator or after the secret has been generated by the network authenticator and transmitted to the embedded device; register the secret for the embedded device using the device identification for the embedded device; and end communication with the embedded device.

10. The network authenticator of claim 9, wherein the network authenticator receives the request to generate the secret for the embedded device.

11. The network authenticator of claim 10, wherein the instructions are further executable to transmit the secret via the secure communication channel.

12. The network authenticator of claim 9, wherein the network authenticator receives the secret for the embedded device, and wherein the secret was generated by the embedded device.

13. A non-transitory computer-readable medium comprising executable instructions for automatic secret generation and distribution for secure systems, the executable instructions being executed by an authentication program on a network authenticator, the instructions being executable to: establish a secure communication channel with an embedded device; receive valid security credentials from the embedded device; determine whether the security credentials have previously been provided to the network authenticator; closing the secure communication channel with the embedded device when it is determined that the security credentials have previously been provided to the network authenticator more than once; receive from the embedded device via the secure communication channel either a secret for the embedded device or a request to generate the secret for the embedded device when it is determined that the security credentials have not previously been provided to the network authenticator, wherein the secret enables authentication of the embedded device to other devices within a secure system; generate the secret and transmit the secret to the embedded device when the network authenticator receives the request to generate the secret; receive device identification from the embedded device, wherein the device identification is received after the secret has been received by the network authenticator or after the secret has been generated by the network authenticator and transmitted to the embedded device; register the secret for the embedded device using the device identification for the embedded device; and end communication with the embedded device.

14. The non-transitory computer-readable medium of claim 13, wherein the network authenticator receives the request to generate the secret for the embedded device.

15. The non-transitory computer-readable medium of claim 14, wherein the instructions are further executable to transmit the secret via the secure communication channel.

16. The non-transitory computer-readable medium of claim 13, wherein the network authenticator receives the secret for the embedded device, and wherein the secret was generated by the embedded device.

* * * * *

UNITED STATES PATENT AND TRADEMARK OFFICE
CERTIFICATE OF CORRECTION

PATENT NO. : 8,281,386 B2  
APPLICATION NO. : 11/314808  
DATED : October 2, 2012  
INVENTOR(S) : Thomas Milligan et al.

Page 1 of 1

It is certified that error appears in the above-identified patent and that said Letters Patent is hereby corrected as shown below:

In the Claims:

In column 17, line 44 please delete "embedded;" and replace it with --embedded device;--.

In column 18, line 31 please delete "authenticator; closing" and replace it with --authenticator; close--.

In column 18, line 63 please delete "executable instructions" and replace it with --instructions--.

In column 18, line 64 please delete "the executable" and replace it with --executable--.

In column 19, line 3 please delete "authenticator; closing" and replace it with --authenticator; close--.

Signed and Sealed this  
Fourth Day of March, 2014

Michelle K. Lee  
*Deputy Director of the United States Patent and Trademark Office*